(12) United States Patent
Hibberd

(10) Patent No.: US 7,654,473 B2
(45) Date of Patent: Feb. 2, 2010

(54) FLEXIBLE WATERING SYSTEM AND METHOD FOR USING SAME

(76) Inventor: Michael J. Hibberd, 8800 S. Beck Pl., Hometown, IL (US) 60456

( * ) Notice: Subject to any disclaimer, the term of this patent is extended or adjusted under 35 U.S.C. 154(b) by 490 days.

(21) Appl. No.: 11/469,717

(22) Filed: Sep. 1, 2006

(65) Prior Publication Data
US 2008/0054096 A1    Mar. 6, 2008

(51) Int. Cl.
*B05B 15/00* (2006.01)
(52) U.S. Cl. .................. 239/289; 239/266; 239/268; 239/269; 239/276; 239/280; 239/283; 239/536; 239/550; 239/565; 239/600; 47/47; 47/48.5
(58) Field of Classification Search ......... 239/266–269, 239/273, 276, 280, 282, 283, 289, 536, 547, 239/550, 565, 600; 47/45, 47, 48.5; 211/127.1, 211/133.1
See application file for complete search history.

(56) References Cited

U.S. PATENT DOCUMENTS

| 648,263 | A | | 4/1900 | Hull |
|---|---|---|---|---|
| 1,361,464 | A | | 12/1920 | Hunt |
| 1,785,314 | A | | 12/1930 | Kelly |
| 1,903,122 | A | | 3/1933 | Merz et al. |
| 1,914,850 | A | | 6/1933 | Foster |
| 2,208,706 | A | | 7/1940 | Spencer |
| 2,359,981 | A | | 10/1944 | Fleming |
| 2,625,434 | A | * | 1/1953 | Freestone ............ 239/280 |
| 2,770,812 | A | | 11/1956 | Whiteside |
| 3,185,397 | A | | 5/1965 | Nelson |
| 3,361,363 | A | | 1/1968 | Babington |
| 3,387,786 | A | | 6/1968 | Rynberk |
| 3,425,630 | A | | 2/1969 | Fessler, Sr. |
| 3,485,449 | A | | 12/1969 | Wilson |
| 3,559,339 | A | | 2/1971 | Worley |
| 3,579,908 | A | | 5/1971 | Morgan |
| 3,625,434 | A | | 12/1971 | Kitover |
| 3,638,814 | A | | 2/1972 | Lowery |
| 3,688,775 | A | | 9/1972 | Raynnann |
| 3,701,477 | A | * | 10/1972 | Matt et al. ............ 239/276 |
| 3,759,445 | A | | 9/1973 | King |
| 3,793,771 | A | | 2/1974 | Slaughter |
| 3,865,309 | A | | 2/1975 | Greenhaigh |

(Continued)

*Primary Examiner*—Steven J Ganey
(74) *Attorney, Agent, or Firm*—Loeb & Loeb LLP

(57) ABSTRACT

A watering system that has first and second upright supports, a plurality of bendable water conduits and substantially rigid water channels and a first spray head is disclosed. Each of the first and second upright supports have substantially laterally oriented brackets dimensioned to releasably hold objects having a first outer diameter, including the bendable water conduits and substantially rigid water channels. The substantially rigid water channels each have a central body and left and right hose barbs in fluid relationship to one another through the central body. The central body has an aperture dimensioned to receive and mechanically engage the insertion end of the first spray head. The first spray head has a spray jet with a first water flow rate. The system may further include second and third spray heads with second and third water flow rates each different from each other and the first water flow rate. The bendable water conduits are preferrably formed from material capable of bending to an acute internal angle without breaking and without substantial kinking. Preferably, the first upright supports are ornamentally camouflaged and may appear to be a picket fence with each first upright support being formed to allow interconnection of the upright supports one to another to allow flexibility.

13 Claims, 14 Drawing Sheets

U.S. PATENT DOCUMENTS

| | | | |
|---|---|---|---|
| 4,073,091 A | 2/1978 | Vogel | |
| 4,077,158 A | 3/1978 | England | |
| 4,519,544 A | 5/1985 | Szabo | |
| 4,548,357 A | 10/1985 | Schmidt | |
| 4,610,106 A | 9/1986 | Robinson | |
| 4,616,442 A | 10/1986 | Lenzner | |
| 4,682,734 A | 7/1987 | Proctor et al. | |
| 4,702,034 A | 10/1987 | Ferguson et al. | |
| 4,763,440 A | 8/1988 | James | |
| 4,778,111 A | 10/1988 | Leap | |
| 4,869,018 A | 9/1989 | Scales et al. | |
| 4,922,653 A | 5/1990 | Stone | |
| 4,925,099 A | 5/1990 | Owen | |
| 4,974,779 A | 12/1990 | Araki et al. | |
| 5,007,587 A | 4/1991 | Daroca | |
| 5,121,882 A | 6/1992 | Skidmore | |
| 5,232,159 A | 8/1993 | Abbate, Sr. et al. | |
| 5,330,104 A | 7/1994 | Marcus | |
| 5,357,710 A | 10/1994 | Dulik et al. | |
| 5,374,138 A | 12/1994 | Byles | |
| 5,436,811 A * | 7/1995 | Hecking | 239/289 |
| 5,540,383 A | 7/1996 | Ducey | |
| 5,722,596 A | 3/1998 | Dome | |
| 5,740,970 A | 4/1998 | Edwards | |
| 5,755,383 A | 5/1998 | Joseph | |
| 5,782,407 A | 7/1998 | VanDegrift | |
| 5,913,477 A * | 6/1999 | Dean | 239/289 |
| 5,956,892 A | 9/1999 | Kownacki et al. | |
| 5,956,893 A | 9/1999 | Harrison | |
| 6,000,172 A | 12/1999 | Ballarino | |
| 6,015,099 A | 1/2000 | Ducey | |
| 6,065,693 A | 5/2000 | Lukas | |
| 6,168,092 B1 * | 1/2001 | Schneider | 239/276 |
| 6,189,805 B1 | 2/2001 | West et al. | |
| 6,325,362 B1 | 12/2001 | Massey et al. | |
| 6,415,461 B1 | 7/2002 | Singer | |
| 6,592,049 B1 | 7/2003 | Wolput | |
| 6,619,570 B1 | 9/2003 | Ericksen et al. | |
| 6,634,435 B2 | 10/2003 | Saeger | |
| 6,827,292 B2 | 12/2004 | Kelly | |
| 6,892,552 B2 | 5/2005 | Richman et al. | |
| D509,714 S | 9/2005 | Speed et al. | |
| 6,981,613 B1 | 1/2006 | Kamisugi | |
| D514,714 S | 2/2006 | Jones | |
| 7,017,299 B1 | 3/2006 | Speed et al. | |

* cited by examiner

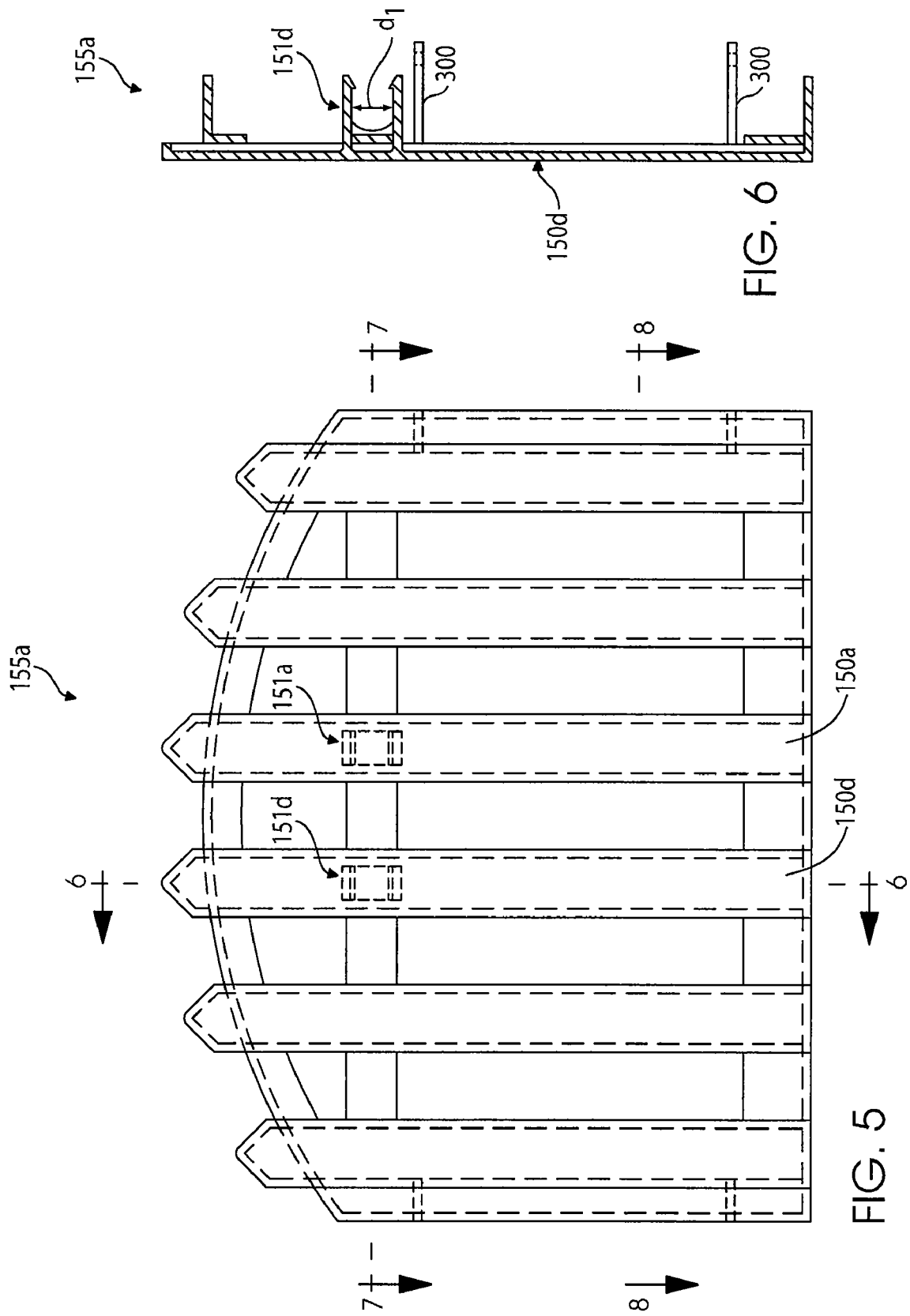

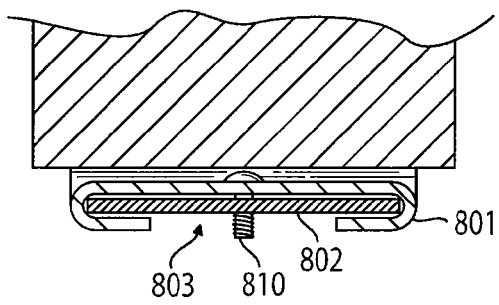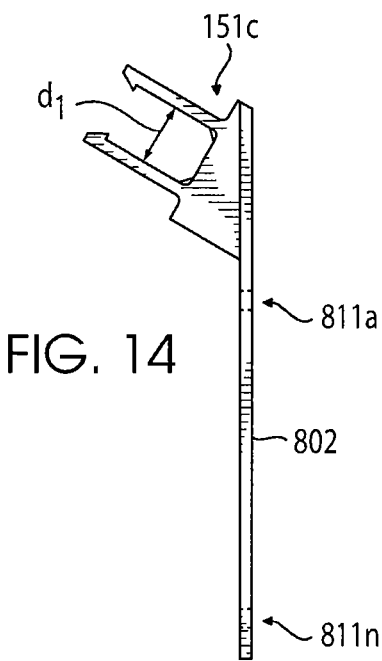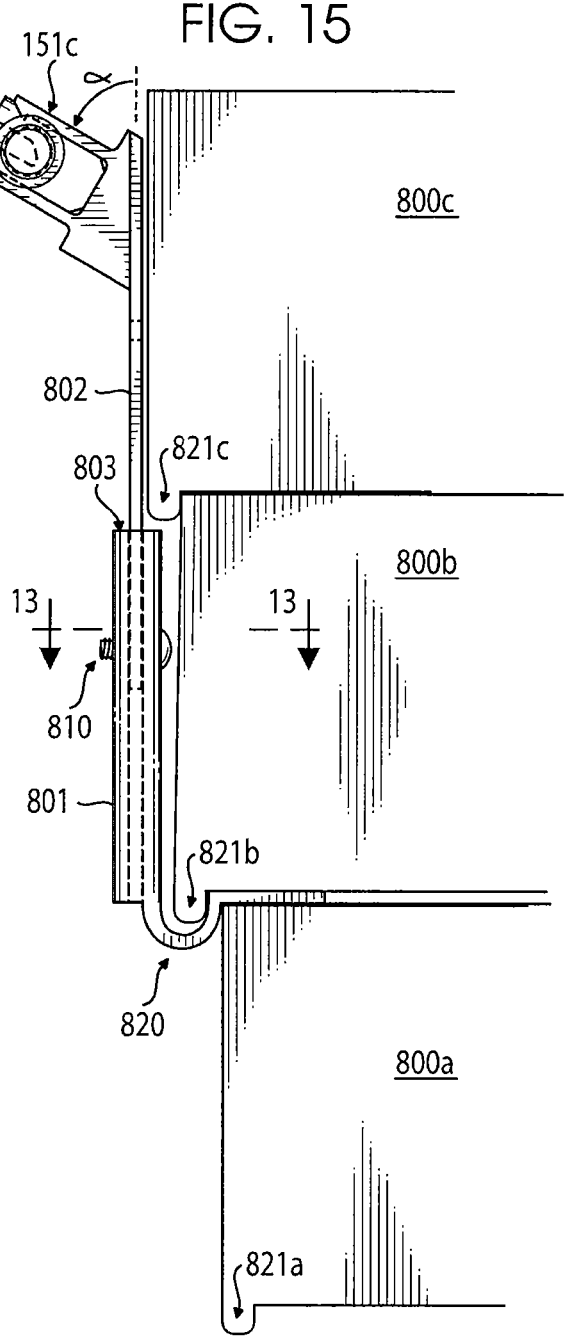

FLEXIBLE WATERING SYSTEM AND METHOD FOR USING SAME

BACKGROUND OF THE INVENTION

1. Field of Invention

The present invention relates in general to garden irrigation and, in particular, to a system and method that provides a flexible water system.

2. Background Art

Gardening has long been a popular, but tedious pastime. Among the more tedious, but necessary activities in gardening is maintaining the proper hydration of flowers, vegetation, and saturation of the soil.

Some people spend a significant amount of time each day manually moving and positioning water sprinklers and garden hoses in various positions about their gardens to ensure that all of the flowers and vegetation receive sufficient water. Other people have installed underground sprinkler systems to minimize the time necessary each day to water their gardens. However, underground sprinkler installation is expensive work often requiring a specialized contractor to install. Installation of underground sprinkler systems requires the digging of trenches throughout the property and creates a significant disruption of the land. It is also difficult to install sprinkler systems around driveways and sidewalks. After installation, the location of sprinkler heads in the underground sprinkler systems are fixed necessitating the gardeners to plan their gardens to conform to the sprinkler system. These fixed sprinkler heads also spray water at a single rate and usually in a limited number of pattern-types, most often using a 360° fountain type water distribution pattern. Thus, there is a need for a more flexible watering system. Preferably, a system that does not require the expensive disruptive installation required by underground sprinkler systems.

Some people have developed above-ground watering systems. However, these systems have largely failed to achieve popularity. One of the possible reasons for this failure results from the inflexible nature of many, if not all, of these systems. Thus, there is a further need for a more flexible water system.

SUMMARY OF THE DISCLOSURE

Generally speaking, the present invention includes watering system that has first and second upright supports, a plurality of bendable water conduits and substantially rigid water channels and a first spray head is disclosed. Each of the first and second upright supports have substantially laterally oriented brackets dimensioned to releasably hold objects having a first outer diameter, including the bendable water conduits and substantially rigid water channels. The substantially rigid water channels each have a central body and left and right hose barbs in fluid relationship to one another through the central body. The central body has an aperture for receiving the insertion end of a spray head. Preferably, the central body aperture is threaded and the insertion end of the spray head has a matching counter-thread to ensure positive engagement between the spray head and the rigid water channel. It is also contemplated that a counter threaded in-line plug will be provided for insertion in central body apertures where no spray head is desired.

The present invention facilitates the interchangeability of first, second and third spray heads. The insertion ends of each of the first and second spray heads being substantially to facilitate interchangeability of the first and second spray heads. Each spray head has an insertion end and a spray jet and out of the package sprays water at a nominal water flow rate (e.g. defined a volume of water passing through the jet per minute). Preferably, the flow rates of the first, second and third spray heads are different and are further selected to rates generally believed desirable for sand, silt and clay soil types, respectively.

The bendable water conduits have a first outer diameter and a conduit inner diameter. The bendable water conduit is formed from material capable of bending to an acute internal angle without breaking and without substantial kinking. The substantially rigid water channel has a central body, a left hose barb and a right hose barb, where the left and right hose barbs are in fluid relationship to one another through the central body. Each of the left and right hose barbs of the rigid water channel have an outer diameter that increases over a portion thereof to at least a diameter substantially equal to the conduit inner diameter. In this manner the left and right hose barbs can receive and positively connect to the bendable water conduits in a substantially fluid-tight manner. The central body of the substantially rigid water channel has a first outer diameter such that the central body is positively engaged by the substantially laterally oriented brackets, which are dimensioned to releasably hold objects having a first outer diameter. The central body of the substantially rigid water channel also has a region pre-stressed to form a water-tight aperture due to insertion of the insertion end of a first spray head.

In a first option for the water system the first upright support has associated therewith means for substantially camouflaging at least the bendable water conduit and substantially rigid water channel from casual observers viewing the watering system from its front side. It is presently contemplated that this means for substantially camouflaging would preferrably have the ornamental appearance of a picket fence. Each picket fence section would preferably have apertured mating flanges dimensioned to allow a stake to pass through each flange and into a supporting surface (e.g. the dirt in the ground, a flower box, planter or other garden setting). It should also be understood that the camouflage need not have the ornamental appearance of a picket fence. It may take a variety of forms, such as other fence styles, decorative benches, decorative sculptures, bird baths, and man-made landscape boulders, for example.

Another option for the present watering system involves its use in association with third-party landscape brick or retaining wall. In this option, a second upright support has substantially the same substantially laterally oriented bracket as the first type of upright support that is dimensioned to releasably hold objects having the first outer diameter. In this option the second upright support has an L bracket and a bracket sled, wherein the L bracket has a substantially vertical channel for slidably receiving the bracket sled therein and the bracket sled has on its front face the substantially laterally oriented bracket. The second upright support further includes means for substantially fixing the bracket sled within the substantially vertical channel, such as a mechanical (screw, nut, bolt, etc.) or chemical fastener (e.g. glue). In a preferred approach, the first L bracket has a recess dimensioned to receive the rear lip found in some landscape brick.

In yet another option for the present watering system, a low profile spray mister may be provided. The upright support of the low profile spray mister is a stake (i.e. a rod with a tapered bottom to facilitate direct insertion into the soil. Preferably, the stake of the low profile spray mister has a substantially rigid water channel integrated therewith. The substantially rigid water channel having a central body, a left hose barb and a right hose barb all in fluid relation with one another. The left and right hose barbs having an outer diameter that increases over a portion thereof to at least a diameter substantially equal to the conduit inner diameter. The low profile spray mister further includes a spray head. Preferably, the spray head of the low profile spray mister is a directionally-adjustable spray jet.

This watering system is designed to be sold in a point of purchase display that provides a variety of interchangeable selections of first and second upright supports and other accessories. Each element of the system being constructed to facilitate the interchangeability of the bendable water conduits and substantially rigid water channels along with the selection of first, second and/or third spray heads desirable for the soil type that will be associated with the system when it is deployed. The display includes photos of soil types in proximity to the various types of spray heads to facilitate the selection thereof. The display preferrably also includes an idea book to facilitate user selection from the various components of the system to design a practically limitless variety of watering systems matching the variety of gardening situations faced by the users.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 3a of the drawings is a top plan view of two fence sections of the present invention mechanically connected together and having a bendable water conduit also connected there between;

FIG. 3b of the drawings is a front elevational view of the two fence sections of FIG. 3a;

FIG. 4a of the drawings is a top plan view of two fence sections of a second embodiment of the fence sections of the present invention mechanically connected together and having a bendable water conduit also connected there between;

FIG. 4b of the drawings is a front elevational view of the two fence section of FIG. 4a;

FIG. 5 of the drawings is a front elevational of view of the first type of fence section of the present invention;

FIG. 6 of the drawings is a cross-sectional view of the fence section of FIG. 5 taken along line 6-6;

FIG. 13 of the drawings is a top plan cross-sectional view of a preferred design-approach for the bracket of the brick-back misting system taken along line 13-13 of FIG. 15;

FIG. 14 of the drawings is a side elevational view of a bracket sled used in the brick-back misting system;

FIG. 15 of the drawings is a side cross-sectional view of the brick-back misting system installed in association with landscape bricks;

DETAILED DESCRIPTION OF THE INVENTION

While the present invention may be embodied in many different forms, several specific embodiments are discussed herein with the understanding that the present disclosure is to be considered only as an exemplification of the principles of the invention, and is not intended to limit the invention to the embodiments illustrated.

Figure 1:
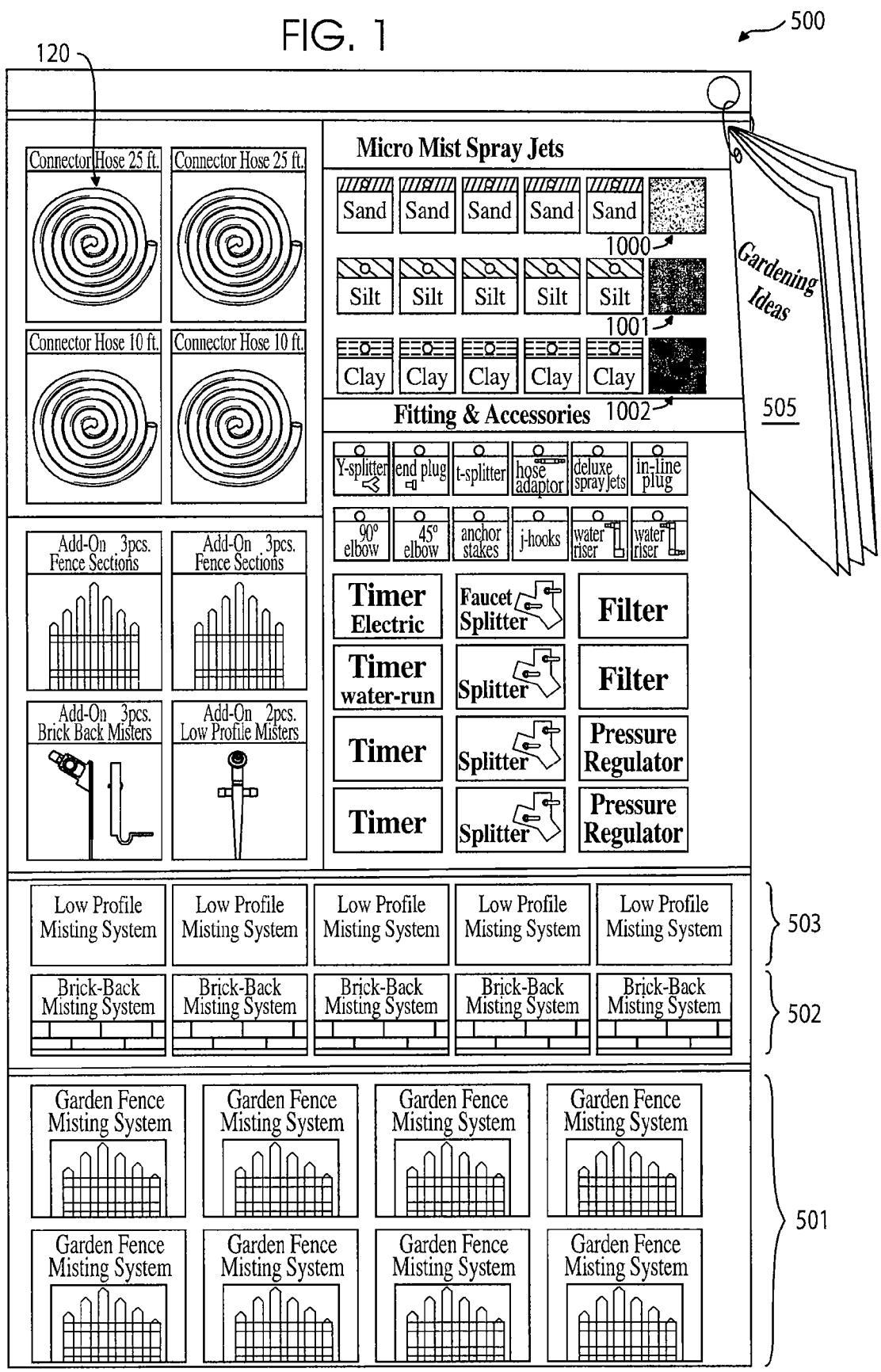
FIG. 1 of the drawings is front plan view of a point of purchase display for the various components found in a preferred approach to the present flexible watering system.
Figure 2:
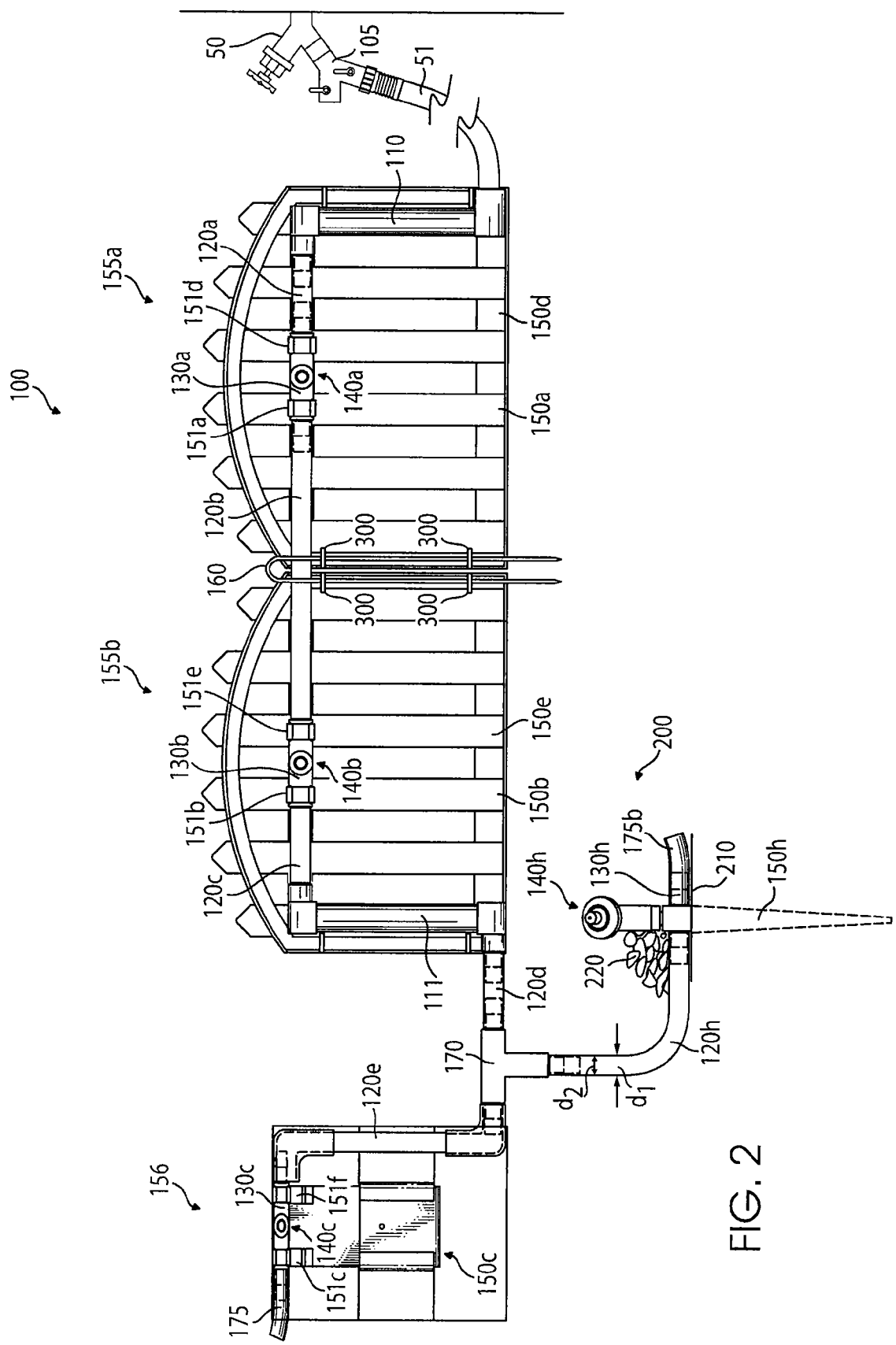
FIG. 2 of the drawings is a rear elevational plan view of one irrigation system that can be formed by combining together the various discrete elements of the flexible watering system found in FIG. 1 and attaching them via a common garden hose to a preexisting water spigot.

FIG. 2 is a rear elevational plan view of one irrigation system 100 that can be formed using the watering system. Irrigation system 100 is merely illustrative of the limitless combinations that can be formed by combining together the various discrete elements of the flexible watering system using even just a subset of the variety of watering system elements depicted in the point-of-purchase display of FIG. 1. Moreover, the elements depicted in FIG. 1 are merely exemplary leaving open the possibility of additional elements and further flexibility for the present system. However, to simplify the present description of the system it should suffice to describe the present novel watering system with reference to the elements specifically depicted in the present application with the understanding that further adaptability of the watering system is contemplated and falls within the scope and spirit of the present invention.

As shown in FIG. 2 irrigation system 100 is connected to preexisting water spigot 50 such as the type commonly found on the exterior of many dwellings in the United States. Although not specifically shown, other types of plumbing elements may be used as a water source for the irrigation system 100. In FIG. 2, irrigation system 100 is connected to the preexisting water spigot 50 using a standard garden hose 51 which is fluid-coupled to the water spigot 50 via a faucet splitter 105. As depicted in FIG. 2, faucet splitter 105 may provide two independent water outlets with threads to provide for a fluid-tight connection between the splitter 105 and two standard garden hoses. Faucet splitter 105 has two independently controllable mechanical valves that allow the two water outlets of splitter 105 to be separately opened or closed. Of course, it will be understood that a faucet splitter 105 is not necessary to the operation of the watering system, but where it is used it would provide further flexibility and convenience to users of the novel watering system. Other optional elements can be added between system 100 and the spigot 50, such as a filter and a water pressure regulator, alone or in combination with one another and the splitter 105.

In the embodiment of FIG. 2, the distant end of standard garden hose 51 is fluid-coupled to the irrigation system 100 via a water riser tube 110. Use of a water riser tube is preferred because it aids in maintaining the position of the standard garden hose 51 lying directly on the ground, which improves the aesthetic appearance of the system.

The first and second legs of depicted irrigation system 100 illustrate garden fence system (155a and 155b) and brick-back misting system (156). Basically, these legs are constructed with at least upright supports 150a, 150b and 150c, a plurality of bendable water conduits 120a, 120b, 120c and 120d and substantially rigid water channels 130a, 130b, and 130c. Spray heads 140a, 140b and 140c have been inserted into rigid water channels 130a, 130b, and 130c, respectively. In the preferred approach shown in FIG. 2 each of upright supports 150a, 150b and 150c have a spaced-part substantially parallel upright support 150d, 150e, and 150f, respectively.

Figure 11:
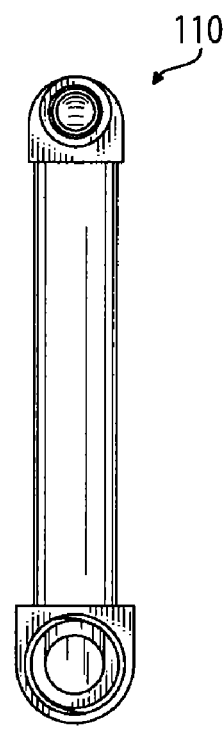
FIGS. 11 and 12 of the drawings are front and side elevational views, respectively of a water riser.
Figure 12:
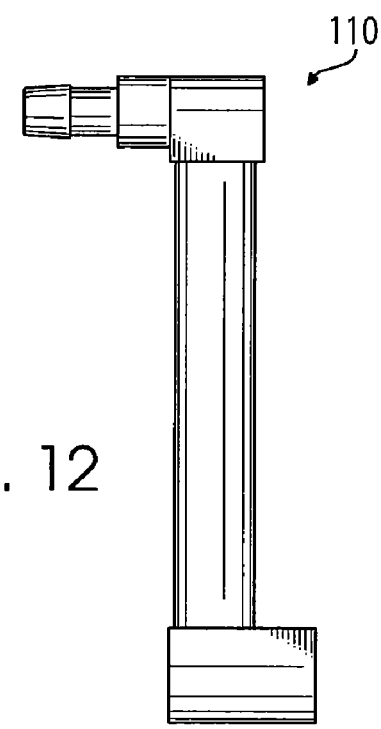

Water riser tube 110 is better seen with respect to FIGS. 11 and 12. In particular, water riser tube 110 has a threaded female receptacle to receive the threads of a standard garden hose at one end and a barbed conduit nipple having an outer diameter that increases over a portion thereof to at least a diameter substantially equal to the conduit inner diameter such that a positive engagement and water-tight seal is formed when bendable water conduit 120a is slid over the end thereof. In this manner, water riser tube 110 also provides a reduction of conduit size between the diameter of the standard garden hose 51 and the diameter of the bendable water conduits 120.

Water riser tube 111 is substantially similar to water riser tube 110, the difference being that tube 111 has two barbed conduit nipples such that it can be used to connect between two bendable water conduits, such as water conduits 120c and 120d. In both instances, the water riser tubes 110 and 111 change the elevation of the water conduit. It should be understood by those of ordinary skill in the art having the present specification before them that two 90° or 45° elbows and a bendable water conduit 120 could be substituted for either or both of water riser tubes 110 and 111.

As best seen with respect to FIGS. 5, 6, 7 and 14, each of the upright supports 150a, 150b, and 150c have a substantially laterally oriented brackets 151a, 151b and 151c, each of which are dimensioned to releasably hold objects having a first outer diameter, $d_1$. Both the bendable water conduits 120 and substantially rigid water channels 130 have the same first outer diameter, $d_1$. In this way the substantially laterally oriented brackets 151 can be used to interchangeably hold either a bendable water conduit or a substantially rigid water channel. This arrangement allows further flexibility in configuring the present watering system to include upright supports 150 that merely maintain the bendable water conduit in a desirable position without providing a watering outlet.

Comparing the substantially laterally oriented bracket 151a from FIGS. 5 and 6 to the substantially laterally oriented bracket 151c of FIGS. 14 and 15 it can be seen that the bracket 151 may be substantially perpendicular to its associated upright support 150 or it may be disposed at a slight angle to the upright support 150. In FIG. 14, a slight 30° angle, $\alpha$, between the longitudinal axis of upright support 150c and the central axis of bracket 151c is depicted. A slight angle, $\alpha$, in the brick-back mist system results in the water spraying in an arcuate spray pattern from spray head 140c onto an adjacent garden providing a desirable aesthetic effect.

Figure 3A:
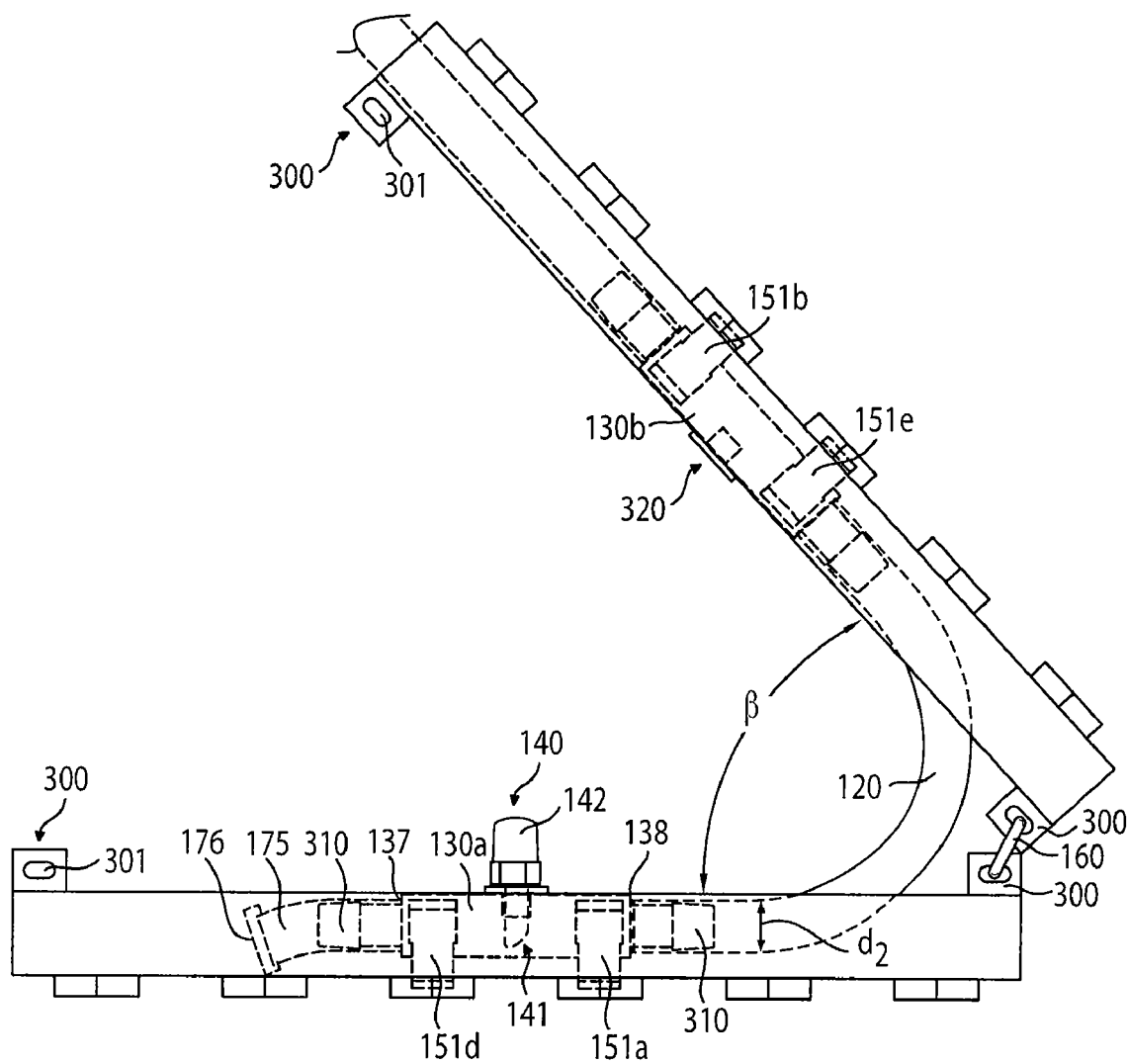
Figure 3B:
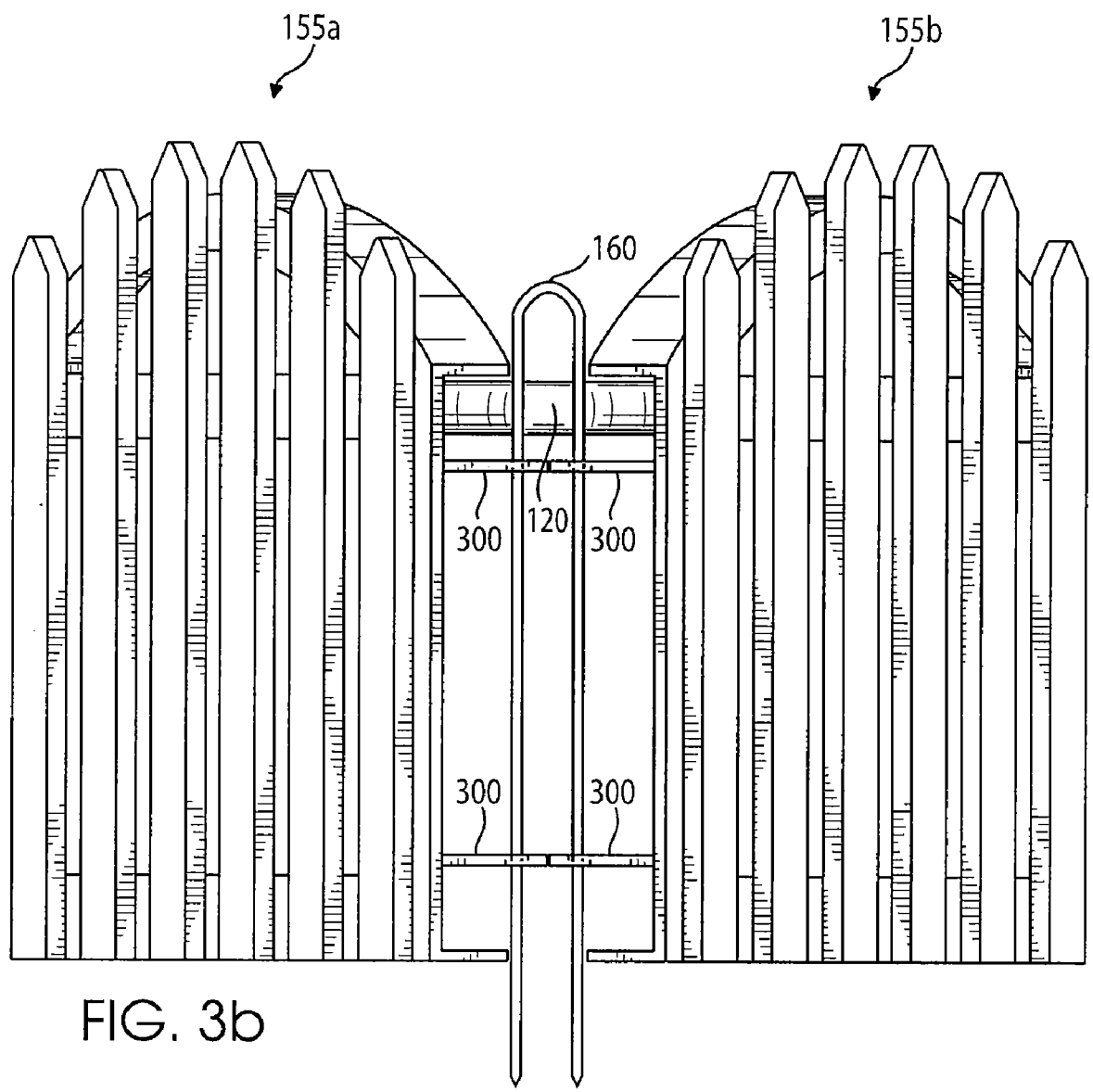
Figure 4A:
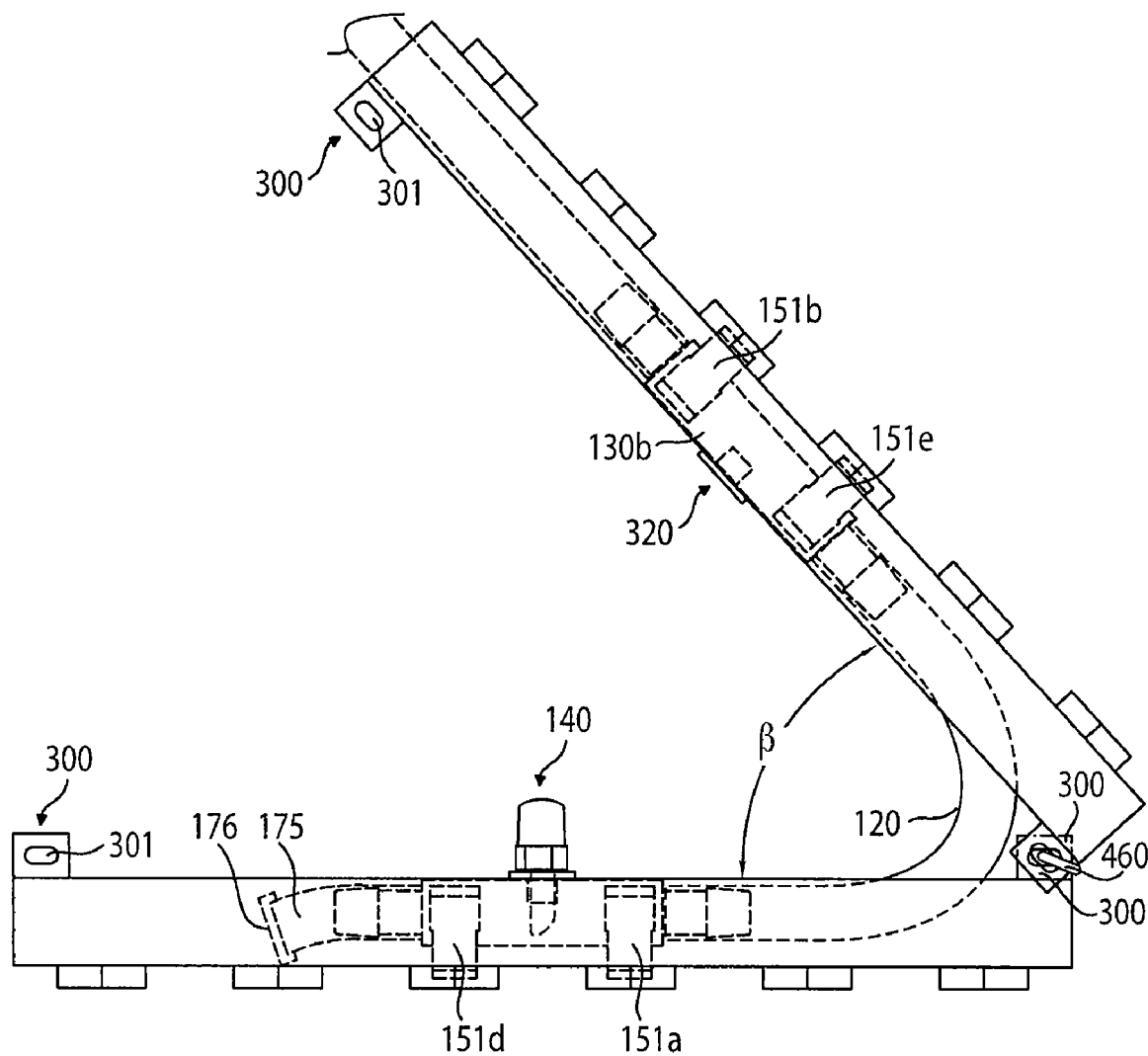
Figure 4B:
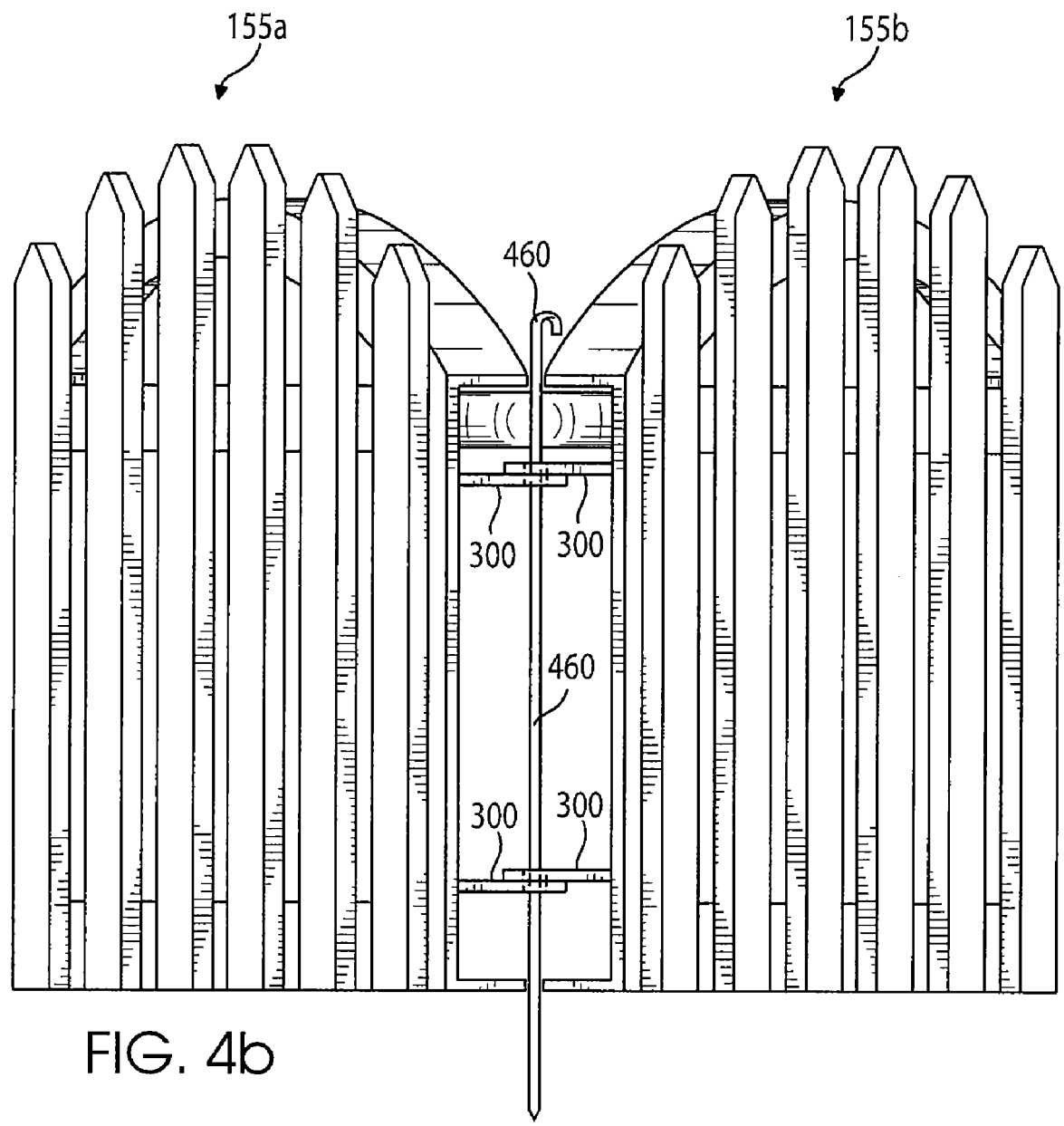
Figure 7:
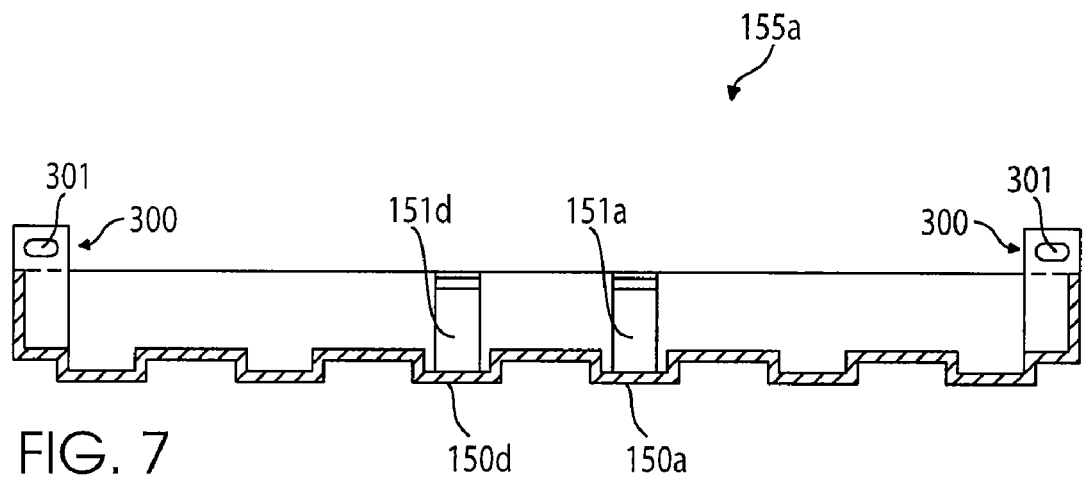
FIG. 7 of the drawings is a cross-sectional view of the fence section of FIG. 5 taken along line 7-7.
Figure 8:
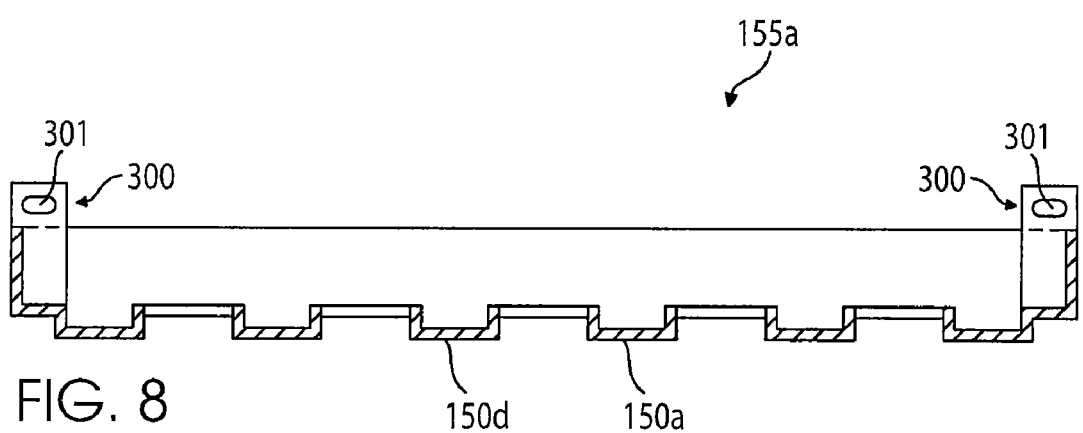
FIG. 8 of the drawings is a cross-sectional view of the fence section of FIG. 5 taken along line 8-8.

As suggested by FIG. 2 and illustrated best in FIGS. 3b and 4b, the bendable water conduits 120, the substantially rigid water channels 130, and the upright supports 150 may be substantially camouflaged from casual observers viewing the watering system from the front side thereof. In one approach the camouflage takes the ornamental appearance of a picket fence 155a and 155b. The picket fence 155 may be dimensioned to fit in a window box or to provide edging for a large garden. As would be understood of those of ordinary skilled in the art, the camouflage need not have the ornamental appearance of a picket fence. It may take a variety of forms, such as other fence styles, decorative benches, decorative sculptures, bird baths, and man-made landscape boulders, for example. As depicted in the picket fence example some camouflage means lends to the inclusion of a second substantially parallel upright support 150d, 150e, and 150f, spaced-part and substantially parallel to upright supports 150a, 150b, and 150c, respectively.

As further shown in FIGS. 2, 3a and 4a, when two camouflaging means are placed adjacent to one another they may be connected together via apertured mating flanges 300 using a staple stake 160 (FIGS. 2, 3a and 3b) or J-hook 460 (FIGS. 4a and 4b). As best seen with reference to FIG. 3a, apertured mating flanges 300 are not configured to readily overlap, instead they normally sit next to one another. Preferably oval apertures 301 facilitate interconnection of the fence section using a staple stake 160 having two legs where one leg passes through the apertures 301 on one fence and the other leg passes through the apertures 301 on the other fence. Both staple legs are forced into a supporting surface, such as the ground or potting soil in a flower box. In a second embodiment shown in FIGS. 4a and 4b, the apertured mating flanges 300 may be staggered to facilitate an overlapping connection of the fence section by sliding a J-hook 460 through both. One disadvantage of this staggered flange system is the need for two different fence types (requiring separate molds and possibly resulting in an unmatchable left-over section). Moreover, the staple stake 160 provides an added benefit in that it provides greater stability than a J-hook because it has two legs posted into the ground. Similarly, it is believe to be easier for an end user to insert the staple stake 160 through the respective apertures 301 and the ground.

Whether or not the upright supports are associated with camouflaging means, it should be understood that a plurality of upright supports may be used within the watering system without the fence sections being placed adjacent to each other.

Figure 9:
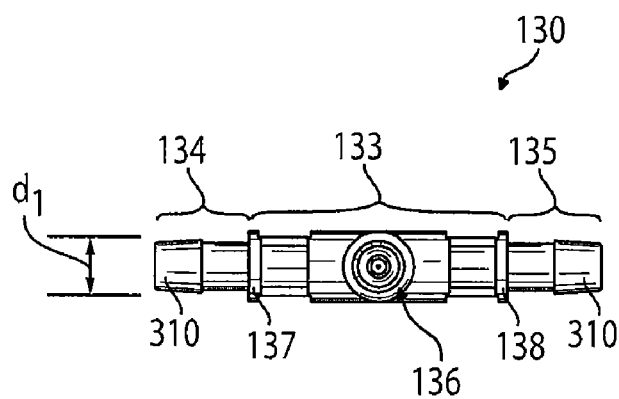
FIG. 9 of the drawings is a front plan view of a substantially rigid water channel.
Figure 10:
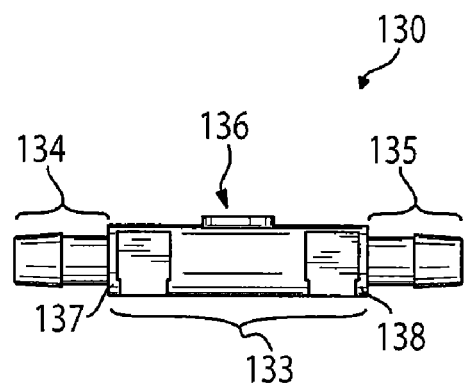
FIG. 10 of the drawings is a top plan view of the substantially rigid water channel of FIG. 9.

As best seen with respect to FIGS. 9 and 10, substantially rigid water channels 130 each have a central body 133, a left hose barb 134 and right hose barb 135. The central body, left hose barb and right hose barb are in fluid relationship to one another through the central body (as depicted in phantom line in FIGS. 9 and 10). The central body 133 has a threaded aperture 136 formed to create a positive connection with the insertion end of the spray head 140 which is counter-threaded to facilitate a substantially water-tight inconnection therebetween. As shown in FIGS. 3a and 4a, where a spray head is not screwed into the central body 133 of the substantially rigid water channel 130b, an in-line plug 320 may be used to substantially seal the aperture 136. Preferably in-line plug 320 is counter-threaded in a manner similar to the insertion end of the spray head 140. It may be possible—particularly where lower water pressures are used—to use an unthreaded rubber plug to force into aperture 136 for sealing.

Each of the left and right hose barbs 134 and 135 of the substantially rigid water channel have an outer diameter that increases over a portion thereof to at least a diameter substantially equal to the conduit inner diameter, $d_2$, of the bendable water conduit 120. As shown in FIGS. 3a and 4a, in this manner an open end of the bendable water conduit 120 may be slid over and onto a hose barb with its increasing diameter positively engaging the bendable water conduit and forming a water-tight connection between the substantially rigid water channel 130 and the bendable water conduit 120. In a preferred approach, the left and right hose barbs 134 and 135 each have a single barb 310, however, it may be desirable in some circumstances to have two or three barbs (not depicted). In a preferred approach, the left and right hose barbs 134 and 135 have water conduit bumpers 137 and 138 that stop the advance of the bendable water conduit before it reaches the central body 133 of the substantially rigid water channel.

The substantially rigid water channels 130 may be formed from A.B.S., HDPE, PP, or other similar materials that can provide sufficient rigidity to allow the water channel 130 and its pre-stressed region 136 to maintain their shape during the forced insertion of the spray head 140.

Figure 16:
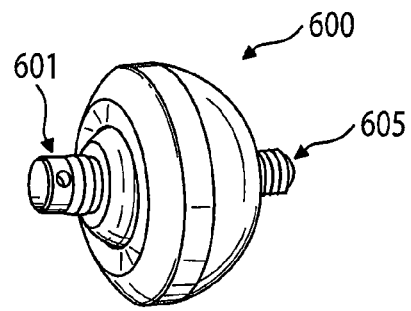
FIG. 16 of the drawings is a perspective view of an adjustable spray jet (without its cap) for use in association with a substantially rigid water channel.
Figure 17:
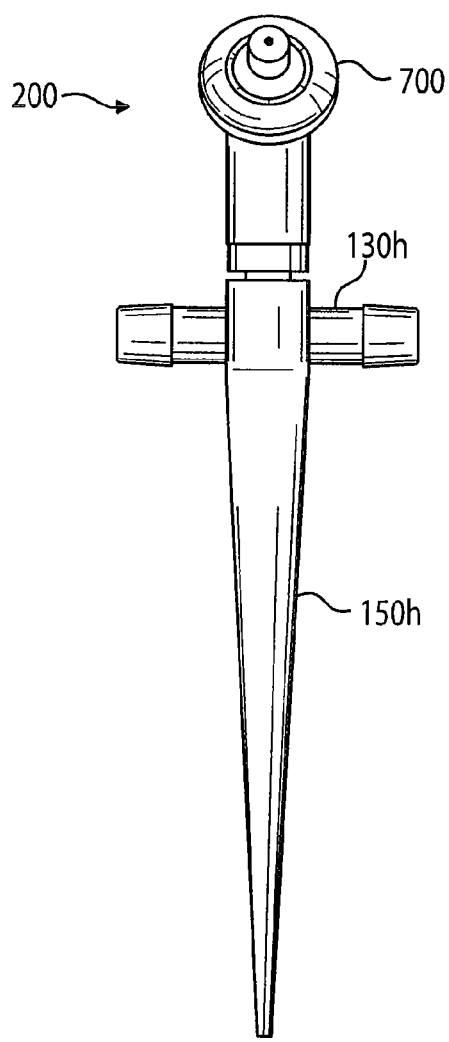
FIG. 17 of the drawings is a front elevational view of the low profile mister of FIG. 2.
Figure 18:
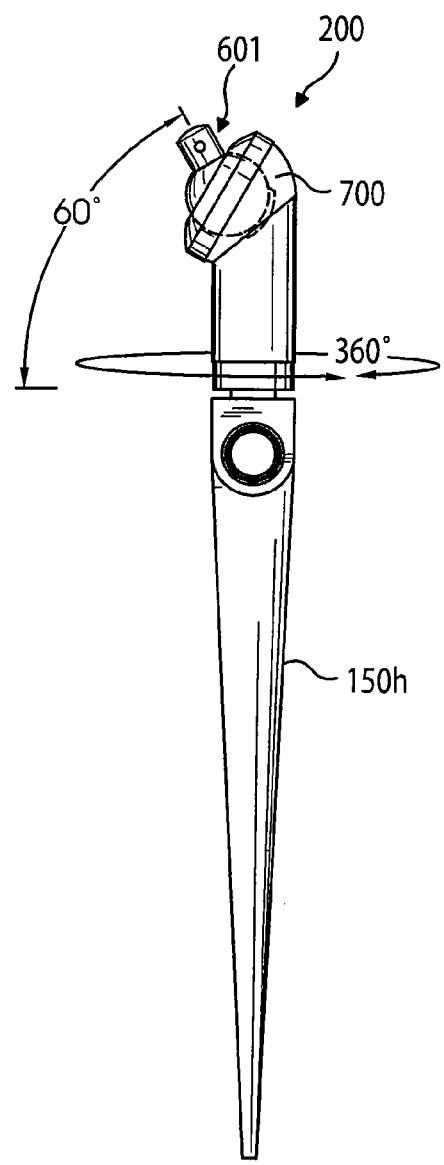
FIG. 18 of the drawings is a side elevational view of the low profile mister of FIG. 17 (with the cap removed from the spout of the spray jet).

Spray heads 140 have an insertion end 141 and a spray jet 142. The spray heads are formed from A.B.S., HDPE, PP, and other materials. The insertion end 141 preferably has a screw thread about its periphery to facilitate positive engagement between the spray head and the substantially rigid water channel 130. The insertion end 141 of the spray heads are substantially identical to facilitate interchangeability of the spray heads with each other. As shown in FIG. 3a, the insertion end 141 may be formed to have a pointed end to facilitate insertion. In a preferred approach, the spray jet 142 is fixed. However, it is contemplated that spray head 142 could be directionally adjustable and/or pattern adjustable. One potential adjustable spray head 600 is shown in FIG. 16. In particular, adjustable spray head 600 has a spray jet that is seated in the housing such that it can move laterally and rotationally with multiple degrees of freedom. (see FIG. 18). Like fixed spray head 142, adjustable spray head 600 may have a threaded insertion end for positive engagement with the rigid water channel aperture. As such, adjustable spray head 600 is interchangeable with spray head 142. A similarly adjustable spray head 700 is associated with the low profile mister system 200, as shown in FIGS. 17 and 18. The difference between adjustable spray heads 600 and 700 is primarily due to the physical integration of spray head 700 with upright support 150h and substantially rigid water channel 130h. As such, unlike spray head 600, spray head 700 does not have an insertion end, threaded or otherwise. As shown in FIG. 18 the adjustable spray head 700 may have 360 degrees of rotation in addition to the 60 degrees of adjustability found also in adjustable spray head 600.

As would be understood by those of ordinary skill in the art having the present specification before them, each of spray heads 142, 600 and 700 may have o-rings and other washers to substantially preclude undesirable water leakage. Furthermore, the adjustable spray head 600 (FIG. 16) is shown without its cap to illustrate the spout 601 disposed underneath the cap in the preferred spray jet construction. The fixed spray head 142 and adjustable spray head 700 also preferably have generally the same type of spout with a water orifice disposed in the side wall. The spray heads 142, 600 and 700 each spray water at a water flow rate (i.e. gallons per hour (GPH)), which is controlled by the number of orifices and their diameters on the cap (shown on spray heads 142 and 700 in FIGS. 3a, 4a, 15 and 17) covering the spout.

It is contemplated that spray jets 142 with at least three different flow rates may be used within the present watering system that are generally believed desirable for sand, silt and clay soil types, respectively. It is also contemplated that other spray head water flow rates may be desirable depending upon the type of vegetation being irrigated by the watering system. In such cases, it would be possible to provide additional spray head types. It is also contemplated that the spray jet heads can be color-coded (through the addition of dyes or other colorants to the base material) to indicate the water flow rate making it easier for the end users to determine the spray jet type easily. The point of purchase display of FIG. 1 preferably includes photos 1000, 1001 and 1002 depicting the respective soil types (i.e. sand, silt and clay) that are positioned physically adjacent the respective spray jet type to facilitate end user selection of the correct spray jet for their soil type. After purchase the option coloration of the spray heads could then assist the end user in determining whether a redeployment of a upright support requires changing to a different spray head to ensure use of the more desirable amount of water for the soil.

The bendable water conduit 120 is a flexible tube formed with PVC, Polyethylene, PVC/Polyurethane, ester-based Polyurethane, and other materials. The bendable water conduit 120 has the same first outer diameter, $d_1$, as the outer diameter of the central body 133 (see FIG. 9) of the substantially rigid water channels 130 to facilitate retention of the bendable water conduit 120 by the substantially laterally oriented bracket 151. As shown in FIGS. 3a, 3b, 4a and 4b, bendable water conduit 120 is formed from material capable of bending to an acute internal angle, β, without breaking and/or substantial kinking. (Substantial kinking is a situation where the bendable water conduit 120 collapses in upon itself substantially impeding the flow of water therethrough.) In particular, FIGS. 3a, 3b, 4a and 4b depict instances where the bendable water conduit 120b is bent to acute internal angle, β. FIGS. 3a and 4a also show the attachment of an end cap 175 that provides a fluid-tight seal to the end of the fluid conduit. In particular, end cap 175 is preferably formed using a piece of bendable water conduit long enough to allow engagement over one of the left or right hose barbs 134 or 135 of a substantially rigid water channel 130 and leave a small tail including a sealed tubing section 320. In this manner end cap 175 positively engages a rigid water channel and can absorb a higher water pressure (if necessary) and still provide a substantially water tight seal.

The third leg of depicted irrigation system 100 depicted in FIG. 2 illustrates the use of a low profile spray mister 200 via connections to the first and second legs of the depicted irrigation system 100 via a T-splitter 170. It should be understood by those of ordinary skill in the art having the present specification before them that each of the legs illustrated in FIG. 2 can be used independently of one another or in combination with one another in a variety of configurations including the one illustrated in FIG. 2 of the drawings. As shown in FIG. 2 the third leg is constructed with bendable water conduit 120h, upright support 150h, substantially rigid water channels 130h, spray head 140h and end cap 175b. It should further be understood based on the present specification that additional elements such as 90° and/or 45° elbows, additional splitters (Y or T type), additional low profile spray misters 200 and other elements may be provided in the third leg. In fact, the number of elements that may be deployed and interchangeably combined in the present system may be quite large with the pragmatic limit presented by the water pressure generally available from pre-existing spigot 50.

As shown in FIG. 2, the upright support 150h of the low profile spray mister is a stake (i.e. a rod tapered toward its bottom to facilitate direct insertion into the soil). Preferably, the stake of the low profile spray mister has a substantially rigid water channel 130h integrated therewith. The substantially rigid water channel 130h has a central body, a left hose barb and a right hose barb all in fluid relation with one another. The left and right hose barbs having an outer diameter that increases over a portion thereof to at least a diameter substantially equal to the conduit inner diameter. The low profile spray mister 200 further includes a spray head 140h. Preferably, the spray head 140h of the low profile spray mister 200 is a directionally-adjustable spray jet, however, fixed spray jets could be used instead.

As illustrated in FIG. 2, when inserted in the ground 210, the adjustable mister 200 may be less than 3 inches above ground level. Further, low-profile mister 200 can also be substantially buried with mulch or stone 220 so that only about 1 inch is visible. In a preferred approach, the adjustable spray head 140h allows the water spray to have a vertical range of 60 degrees and a horizontal range of 360 degrees. In this manner, the nozzle can be pointed at the plant/flower or at the soil 210 beneath the plant/flower.

FIGS. 13, 14 and 15 more particularly illustrate the upright support 150c for use in association with landscape bricks 800, retention walls or the like ("brick-back"). Like upright support 150a, upright support 150c has a substantially laterally oriented bracket 151c dimensioned to releasably hold objects having the first outer diameter, $d_1$. Unlike upright support 150a, upright support 150c includes two pieces that form an adjustable telescoping support to make upright support 150c height adjustable. In this manner, upright support 150c can be adjusted so that the substantially rigid water conduit and associate spray head are deployed at any height and preferably immediately below the top edge of the top landscape brick 800c. As shown in FIGS. 13 and 15, upright support 150c has an L bracket 801 and a bracket sled 802. The weight of landscape bricks 800b and 800c hold L bracket 801 in place. It is contemplated that even only one landscape brick might be used. In that case, the L-bracket would be placed between the brick and the ground with the weight of the landscape brick 800a holding the L bracket in place.

The L bracket 801 has a substantially vertical channel 803 for slidably receiving the bracket sled 802 therein. The bracket sled 802 has the substantially laterally oriented bracket 151c on its front face. Means for substantially fixing the bracket sled 802 within the substantially vertical channel 803 are also included. As shown in FIGS. 13 and 15 those means may comprise a nut 810 and a series of apertures 811a through 811n (see FIG. 14) serially disposed at intervals along the height of the bracket sled 802. Alternatively, the means for fixing the height of the bracket sled 802 within the vertical channel 803 may comprise only the nut 810 mechanically interacting with the face of the bracket sled 802. Other mechanical and chemical means for fixing a relative height between the two pieces of upright support 150c may be used.

In a preferred embodiment shown in FIG. 15, the L bracket 801 has a recess 820 dimensioned to receive a rear lip 821 of the landscape brick 800.

Figure 1A:
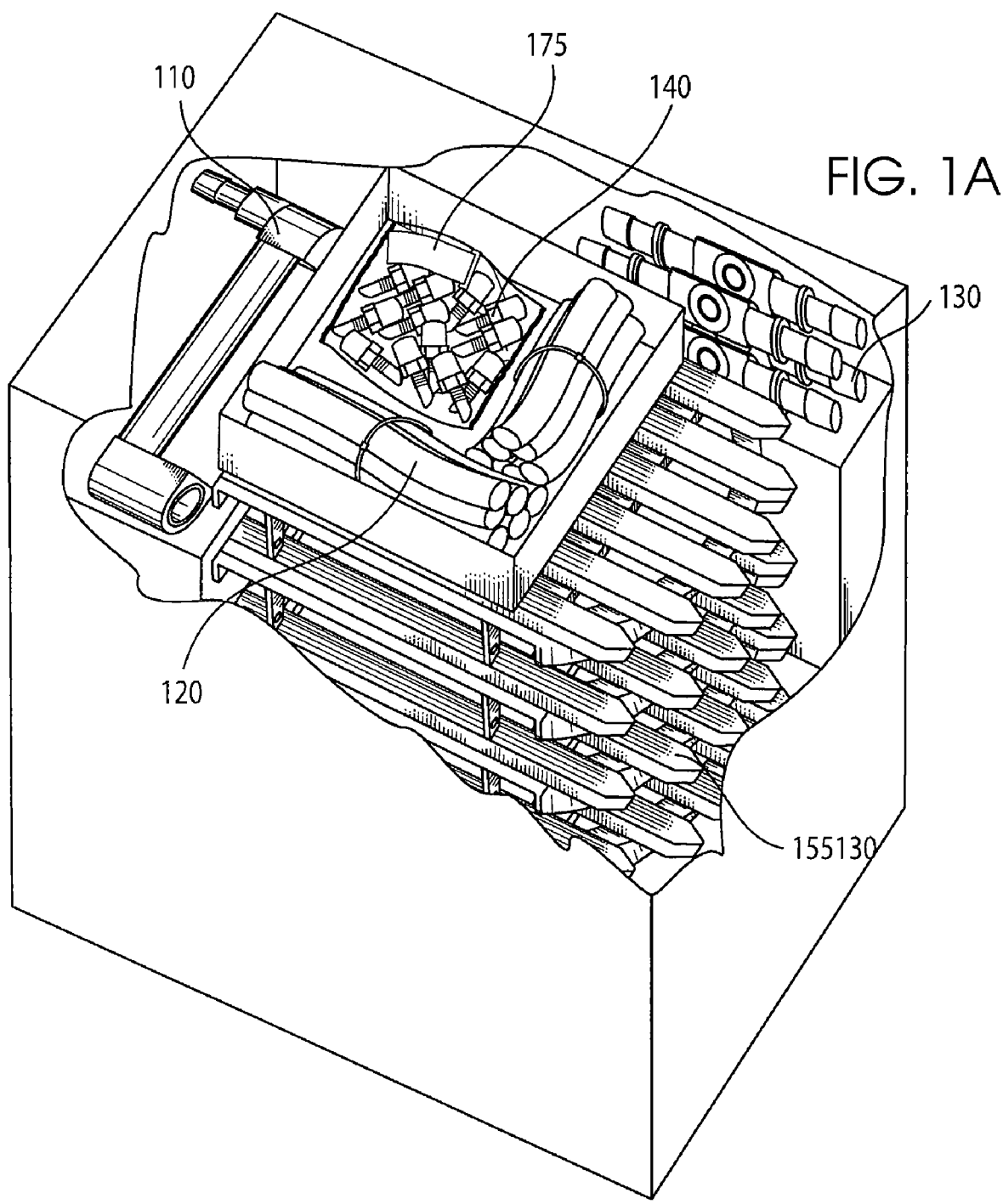
FIG. 1A of the drawings is a breakaway isometric view of the contents of a watering fence package found in the point of purchase display of FIG. 1.
Figure 1B:
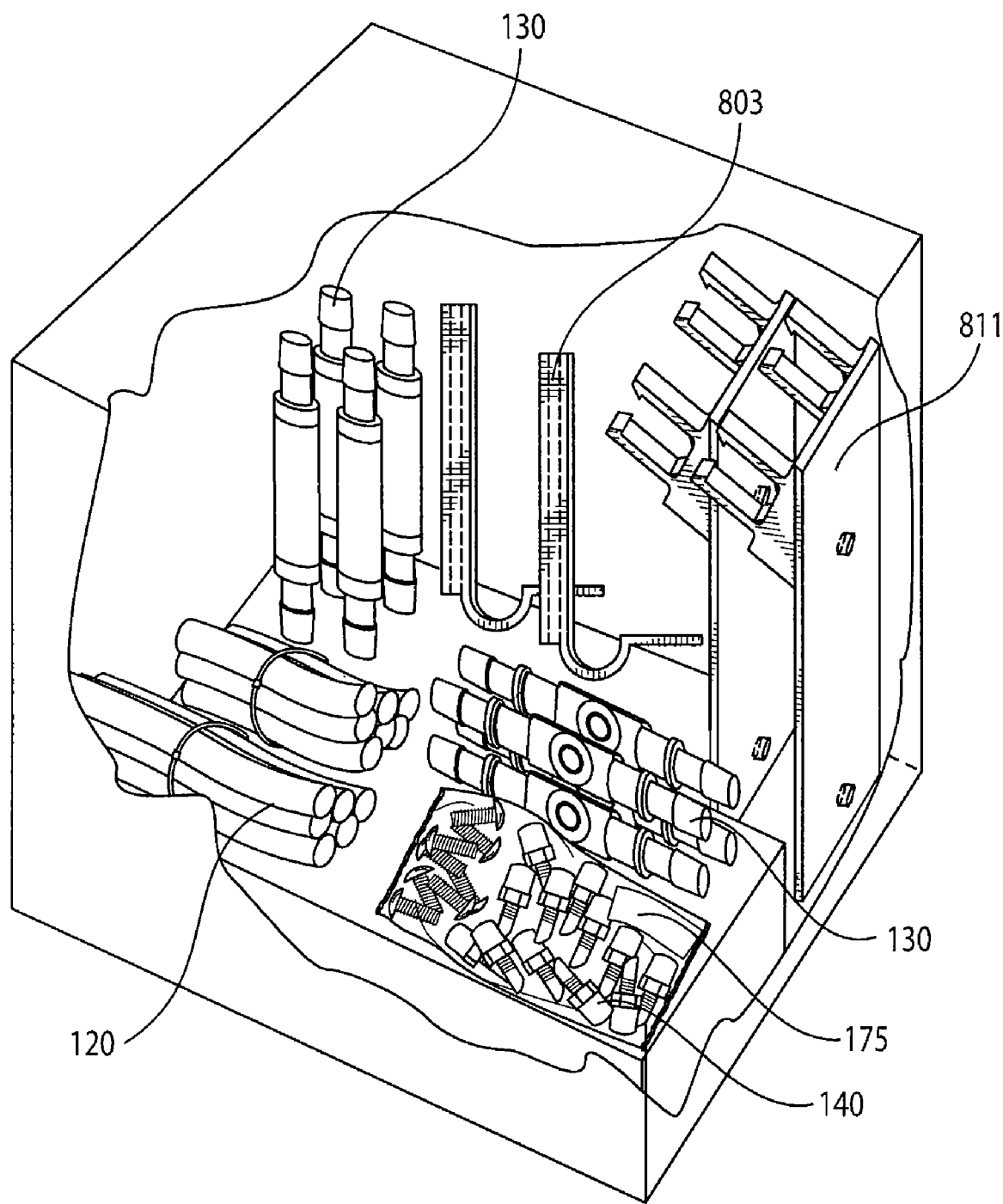
FIG. 1B of the drawings is a breakaway isometric view of the contents of a brick-back misting system package found in the point of purchase display of FIG. 1.
Figure 1C:
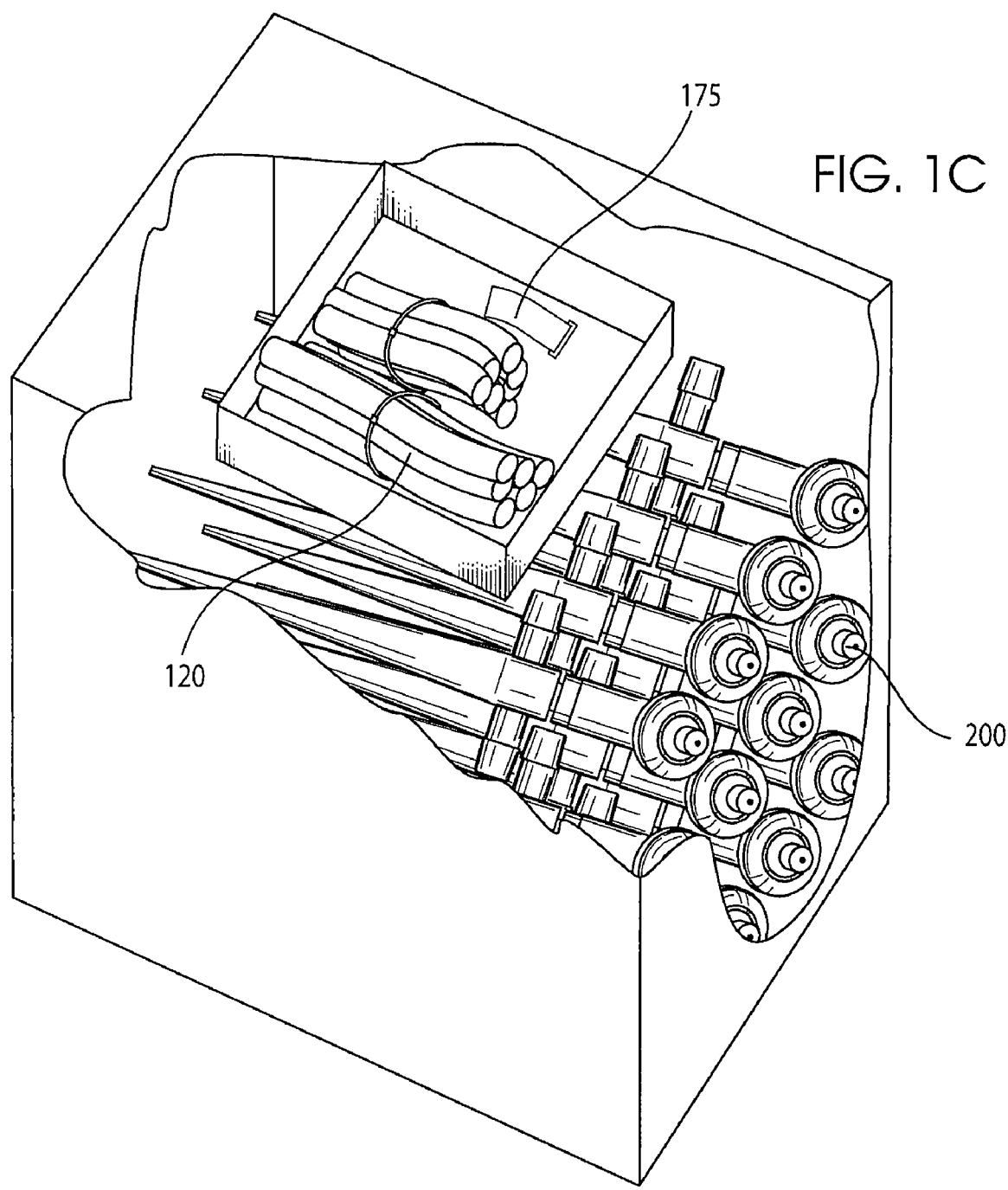
FIG. 1C of the drawings is a breakaway isometric view of the contents of a low profile misting system package found in the point of purchase display of FIG. 1.

FIG. 1 of the drawings is front plan view of one potential approach to a point of purchase display 500 for displaying the various components that can be used in a preferred approach to the present watering system. Among other things, the display 500 of FIG. 1 communicates to potential and current end users the broad flexibility of the present system in its ability to provide water solutions for a variety of gardening situations. Display 500 may include shelves to display boxes 501 and 502, which contain starter selections of watering system components around which most consumers will be able to design a desirable system. FIGS. 1A, 1B and 1C disclose the contents of boxes 501, 502, and 503, respectively. For example, box 501 provides elements for a basic picket fence arrangement having a preselected number of fence sections 155 (such as a dozen), a similar plurality of bendable water conduits 120, substantially rigid water channels 130 and spray heads 140, as well as one water riser 110, one end cap 175 and a number of in-line plugs 320. Boxes 502 and 503 provide elements for a basic system for use with landscape bricks (not included) and a low profile system.

The display 500 of FIG. 1 also depicts displaying three types of spray heads using a matrix of hooks and hanging packages. As shown, the packages are preferrably color-coded to match the color coding of the spray heads. Associated with each row of the spray head display area there is preferably a photograph or other graphic depicting the type of soil associated with the spray head type.

The display 500 also preferably includes a book 505 to assist the consumer in selecting accessories for the watering system. Among the accessories shown in FIG. 1 are electric watering timers, mechanical watering timers, faucet splitters 105, Y-splitters, 45° and 90° elbow bends, end plugs 175, extra substantially rigid water channels 130, water risers 110, water risers 111, garden stakes 301, 10 ft and 25 ft rolls of bendable water conduit 120, additional fence sections 155, additional low-profile misters 200 and additional brick-back misters. As would be understood by those skilled in the art other accessories and additional components may be made available on display 500.

The foregoing description and drawings merely explain and illustrate the invention and the invention is not limited thereto. While the specification in this invention is described in relation to certain implementation or embodiments, many details are set forth for the purpose of illustration. It will thus be appreciated that those skilled in the art will be able to devise various arrangements which, although not explicitly described or shown herein, embody the principles of the invention and, thus, fall within its scope and spirit.

What is claimed is:

1. A watering system comprising:
   a first spray head, the first spray head having an insertion end and a spray jet, the spray jet having a first water flow rate;
   a first bendable water conduit, the bendable water conduit having a first outer diameter and a conduit inner diameter;
   a first substantially rigid water channel having a central body, a left hose barb and a right hose barb, where the left and right hose barbs are in fluid relationship to one another through the central body, each of the left and right hose barbs have an outer diameter that increases over a portion thereof to at least a diameter substantially equal to the conduit inner diameter, the central body having the first outer diameter, the central body further having an aperture dimensioned to receive and mechanically engage the insertion end of the first spray head;
   a first upright support having a substantially laterally oriented bracket associated therewith, the lateral bracket being dimensioned to releasably hold objects having the first outer diameter;
   a second spray head, the second spray head having an insertion end and a spray jet, the spray jet having a second water flow rate;

a second bendable water conduit, the second bendable water conduit having the first outer diameter and the conduit inner diameter;

a second substantially rigid water channel having a central body, a left hose barb and a right hose barb, where the left and right hose barbs are in fluid relationship to one another through the central body, each of the left and right hose barbs have an outer diameter that increases over a portion thereof to at least a diameter substantially equal to the conduit inner diameter, the central body having the first outer diameter, the central body further having an aperture dimensioned to receive and mechanically engage the insertion end of the first spray head;

a second upright support having a substantially laterally oriented bracket associated therewith, the lateral bracket being dimensioned to releasably hold objects having the first outer diameter;

first and second means for substantially camouflaging the first and the second bendable water conduit, the first and the second substantially rigid water channel and the first and the second upright support from casual observers viewing the watering system from the front side thereof wherein the first and second camouflaging means have the ornamental appearance of a picket fence;

the first and second camouflaging means have apertured mating flanges; and a stake passing through each flange aperture and into a supporting surface.

2. The watering system of claim 1 wherein the first and second water flow rates are different.

3. The watering system of claim 1 further including a second spray head, the second spray head having an insertion end and a spray jet, the second spray jet having a second water flow rate different from the first water flow rate, the insertion ends of the first and second spray heads being substantially the same to facilitate interchangeability of the first and second spray heads.

4. The watering system of claim 3 further including a third spray head, the third spray head having an insertion end and a spray jet, the third spray jet having a third water flow rate different from both the first and second water flow rates, the insertion ends of the first, second and third spray heads being substantially the same to facilitate interchangeability of the first, second and third spray heads.

5. The watering system of claim 4 wherein the first, second and third spray rates are selected to provide a gallons per hour generally believed desirable for sand, silt and clay soil types, respectively.

6. The watering system of claim 1 wherein the first bendable water conduit is formed from material capable of bending to an acute internal angle without breaking and without substantial kinking.

7. A watering system comprising:

a first spray head, the first spray head having an insertion end and a spray jet, the spray jet having a first water flow rate;

a first bendable water conduit, the bendable water conduit having a first outer diameter and a conduit inner diameter;

a first substantially rigid water channel having a central body, a left hose barb and a right hose barb, where the left and right hose barbs are in fluid relationship to one another through the central body, each of the left and right hose barbs have an outer diameter that increases over a portion thereof to at least a diameter substantially equal to the conduit inner diameter, the central body having the first outer diameter, the central body further having an aperture dimensioned to receive and mechanically engage the insertion end of the first spray head;

a first upright support having a substantially laterally oriented bracket associated therewith, the lateral bracket being dimensioned to releasably hold objects having the first outer diameter;

means for substantially camouflaging at the first bendable water conduit, the first substantially rigid water channel and the first upright support from casual observers viewing the watering system from the front side thereof, wherein the means for substantially camouflaging has the ornamental appearance of a picket fence;

a second upright support having a substantially laterally oriented bracket associated therewith, the lateral bracket being dimensioned to releasably hold objects having the first outer diameter, the second upright support including an L bracket and a bracket sled, wherein the L bracket has a substantially vertical channel for slidably receiving the bracket sled therein and the bracket sled has on its front face the substantially laterally oriented bracket, the second upright support further includes means for substantially fixing the bracket sled within the substantially vertical channel;

a second spray head, the second spray head having an insertion end and a spray jet, the spray jet having a second water flow rate;

a second bendable water conduit, the second bendable water conduit having the first outer diameter and the conduit inner diameter; and a second substantially rigid water channel having a central body, a left hose barb and a right hose barb, where the left and right hose barbs are in fluid relationship to one another through the central body, each of the left and right hose barbs have an outer diameter that increases over a portion thereof to at least a diameter substantially equal to the conduit inner diameter, the central body having the first outer diameter, the central body further having an aperture dimensioned to receive and mechanically engage the insertion end of the first spray head.

8. The watering system of claim 7 wherein the first L bracket has a recess dimensioned to receive a rear lip of a landscape brick.

9. The watering system of claim 7 wherein the first and second flow rates are different.

10. The watering system of claim 7 wherein the first bendable water conduit is formed from material capable of bending to an acute internal angle without breaking and without substantial kinking.

11. A watering system comprising:

a first spray head, the first spray head having an insertion end and a spray jet, the spray jet having a first water flow rate;

a first bendable water conduit, the bendable water conduit having a first outer diameter and a conduit inner diameter;

a first substantially rigid water channel having a central body, a left hose barb and a right hose barb, where the left and right hose barbs are in fluid relationship to one another through the central body, each of the left and right hose barbs have an outer diameter that increases over a portion thereof to at least a diameter substantially equal to the conduit inner diameter, the central body having the first outer diameter, the central body further having an aperture dimensioned to receive and mechanically engage the insertion end of the first spray head; and a first upright support having a substantially laterally oriented bracket associated therewith, the lateral bracket being dimensioned to releasably hold objects having the first outer diameter wherein the first upright support comprises a first L bracket, a first bracket sled, wherein the first L bracket has a substantially vertical channel for slidably receiving the first bracket sled therein and the first bracket sled has on its front face the substantially laterally oriented bracket, the first upright support further includes means for substantially fixing the first bracket sled within the substantially vertical channel.

12. The watering system of claim 11 wherein the first L bracket has a recess dimensioned to receive a rear lip of a landscape brick.

13. The watering system of claim 11 wherein the first bendable water conduit is formed from material capable of bending to an acute internal angle without breaking and without substantial kinking.

* * * * *